Oct. 16, 1956    W. H. NEWMASTER ET AL    2,766,684
NEEDLE BRAKE FOR AGRICULTURAL BALERS
Filed April 8, 1954
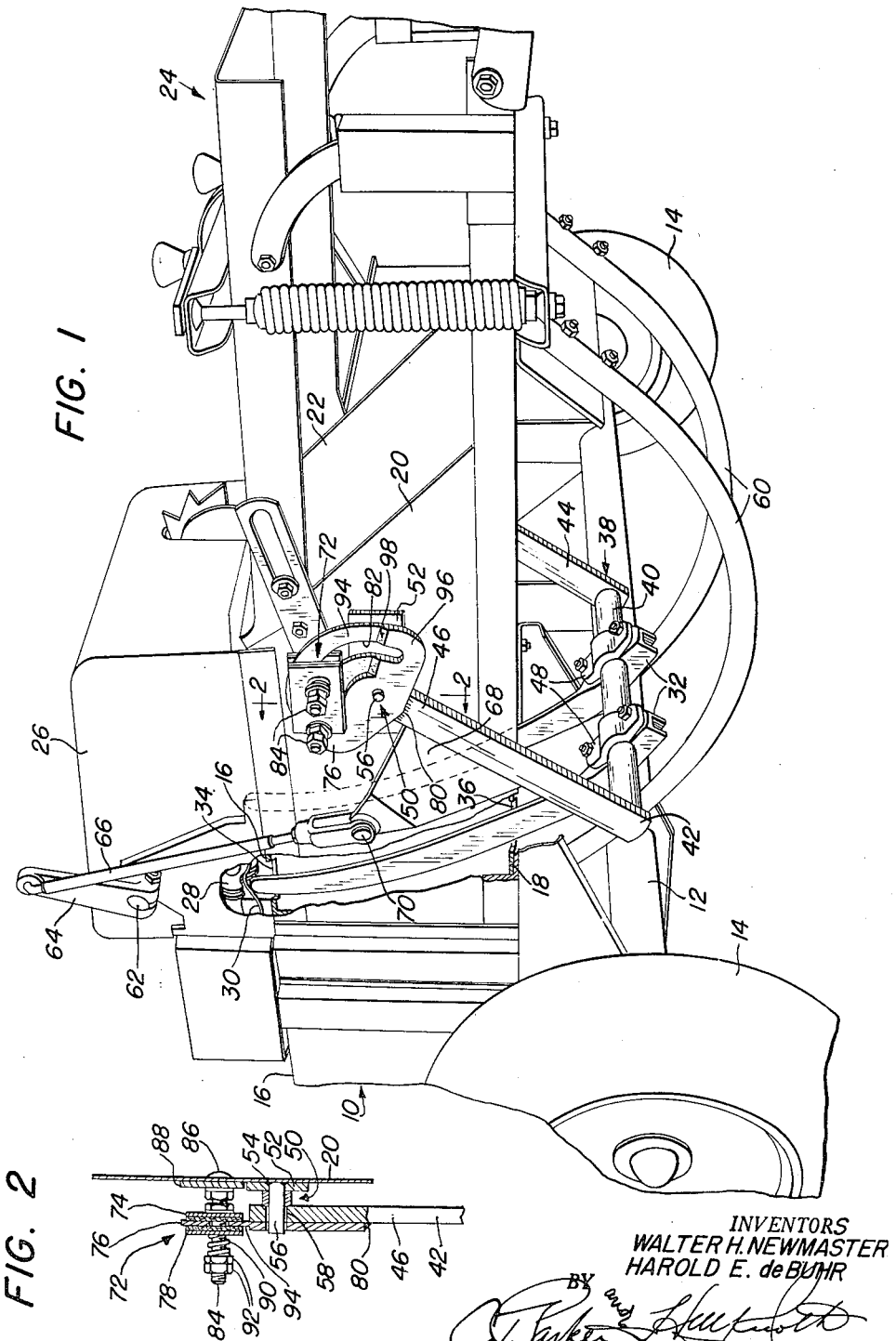
INVENTORS
WALTER H. NEWMASTER
HAROLD E. de BUHR
BY
ATTORNEYS

United States Patent Office 2,766,684
Patented Oct. 16, 1956

2,766,684

NEEDLE BRAKE FOR AGRICULTURAL BALERS

Walter H. Newmaster and Harold E. de Buhr, Ottumwa, Iowa, assignors to Deere Manufacturing Co., Dubuque, Iowa, a corporation of Iowa Application April 8, 1954, Serial No. 421,862

11 Claims. (Cl. 100—19)

This invention relates to an agricultural baler and more particularly to brake means for braking the motion of the needle.

In a typical baler of the general character referred to, bales are successively formed and tied in an elongated bale case through which the bales are forced by a compressing plunger. At measured intervals, tying mechanism operates to effect the tying of the individual bales and in presently known balers, the operation of the baler, as well as that of the tying mechanism, is continuous and automatic, as long as material is available, barring breakdown. One of the most popular tying systems comprises tying mechanism in the form of a twister or knotter, mounted at one side of the bale case, and a movable needle, normally carried at the opposite side of the bale case but movable at intervals across the bale case to carry a strand of tying medium, such as wire or twine, to the knotter or twister. The movement of the needle between normal and tying position and return is cyclic and it will therefore be appreciated that, especially during relatively high-speed operation, the reciprocating or oscillating movement of the needle is attended with rather instantaneous stopping and starting or acceleration and deceleration at opposite ends of each of its strokes. In the absence of some form of cushioning means, premature replacement of the needle, and perhaps part of the tying mechanism, is not unexpected.

According to the present invention, a braking means is provided for retarding the needle or needle-carrying means so as to absorb all if not a major portion of the shock incident to stopping of the needle, particularly on its return stroke; although, the particular form of braking means disclosed is effective at both ends of each needle stroke. It is a feature of the invention to provide a simplified brake device that may be utilized in needle and tying mechanism structures of generally conventional types, therefore eliminating the necessity for considerable revision of the basic structure. The brake means features a pair of cooperative brake members or elements, one of which is fixed to the bale case alongside of a swingable needle-carrying arm, the other being frictionally engageable in face-to-face contact with the first member and interconnected by yielding means. It is a further object of the invention to arrange the brake means in such fashion that the angular movement thereof is held to a minimum, which object is accomplished by mounting the brake means relatively close to the pivot on which the needle-carrying arm is supported; specifically, the brake means is located beyond the pivot as a radial extension of the arm, thereby permitting a brake means of relatively small size. In another aspect of the invention, the brake part that is carried by the needle-carrying arm is in the form of a plate having therein an arcuate slot established about the needle-carrying arm pivot and yielding means is provided for interconnecting the two brake parts. A further feature is the use of a portion of the yielding means as part of the means for mounting the brake structure on the bale case. It is also an object of the invention to utilize brake means that has increasing effect at the end of the stroke of the needle, thereby permitting full acceleration of the needle intermediate the ends of its stroke.

Also important is the function of the brake in holding the needle during its dwell period in tying position so that it cannot fall away by gravity because of looseness in the drive parts. The brake further eliminates other previously noted disadvantages flowing from back lash.

The foregoing and other important objects and desirable features inherent in and encompassed by the invention will become apparent to those conversant with the art to which the present invention relates as a preferred embodiment of the invention is described in detail in the following description and as illustrated in the accompanying sheet of drawings, the two figures of which will be described immediately below.

Fig. 1 is a perspective view of the rear portion of a typical baler, illustrating the arrangement and use of the invention, a portion of the view being broken away to expose the interior of the baler structure.

Fig. 2 is a sectional view, on an enlarged scale, as seen along the line 2—2 of Fig. 1.

The baler chosen for the purposes of illustration may be of any conventional type. That shown comprises an elongated bale case 10 supported on main frame structure including a transverse axle 12 on opposite ends of which are journaled ground-engaging wheels 14. The bale case 10 is made up of top and bottom walls 16 and 18 and opposite, transversely spaced apart upright side walls 20 and 22. A bale case extension, designated generally by the numeral 24, is illustrated as comprising part of the bale case 10. This extension operates in the conventional manner and forms no part of the present invention.

A housing or enclosure 26 is carried on the bale case at the top wall 16 thereof and encloses conventional tying mechanism, the details of which are not important here and therefore are not fully illustrated. The tying mechanism may be of any well known type, one example of which forms the subject matter of the U. S. Patent to Ware 702,335. In Fig. 1, a portion of the housing 26 has been broken away to expose part of a typical cord holder 28, and a tying strand is visible at 30. As is usual, the tying strand 30 has been brought into position relative to the tying mechanism 28 by needle means comprising a pair of arcuate needles 32 mounted on the bale case, in a manner to be presently described, for swinging movement between a normal position and a tying position. The position shown in Fig. 1 is the tying position, it being noted that the points of the needles are in cooperative association with the tying mechanism 28 and tying strand 30. A portion of the bale case has been broken away in Fig. 1 to disclose that the top wall 16 is apertured, as at 34, and that the bottom wall 18 is apertured, as at 36, to accommodate the needles 32 as the points thereof traverse or move upwardly and downwardly across the bale case between normal and tying positions.

Mounting of the needles 32 on the bale case for movement as aforesaid is here accomplished by a needle carrier designated generally by the numeral 38. The carrier comprises a U-shaped element having a transverse bight 40 and a pair of transversely spaced apart arms 42 and 44 rigidly joined to the bight 40 and projecting upwardly respectively outwardly of and alongside the bale case walls 20 and 22, the arrangement being such that the U-shaped element 38 embraces the bale case from below. Since the structure and relationship of the arms 42 and 44 may be symmetrical, if not identical, and since only the arm 42 appears in its entirety, the following description will relate to the arm 42, and it may be assumed that what is true of the arm 42 is likewise true of the arm 44;

although, this assumption is to be made in the sense that no limitations are thereby imported into the invention.

The arm 42 has an upper terminal end portion 46 at a level between the levels of the top and bottom bale case walls 16 and 18. The U-shaped element 38 is mounted on the bale case for swinging movement back and forth to carry the needles 32 between the normal and tying positions thereof, the needles being secured to the transverse bight 40 of the element 38 by appropriate clamp means as at 48. The pivotal mounting means comprises a pivot means, designated generally by the numeral 50, including a supporting bracket 52 mounted on the proximate bale case side wall 20 and having integrally joined thereto, as by welding at 54, a trunnion or outwardly projecting pivot stud 56. This stud enters an aperture 58 in the upper terminal end portion 46 of the associated needle-carrying arm 42. As previously stated, it will be appreciated that a similar pivot means 50 is positioned at the opposite side of the bale case and similarly supports the upper terminal end portion of the other element or needle-carrying arm 44. Thus, the pivot means 50 will obviously be transversely spaced apart and coaxial, one being mounted on the bale case wall 20 and the other being mounted on the opposite bale case wall 22.

From the description thus far, it will be appreciated that the element 38 is pivotally mounted on the transverse axis by the pivot means 50 and is therefore swingable in an arc about that axis. The arc of swinging may be best comprehended by observing the position and relationship of a pair of guard rails 60, affixed to lower portions of the bale case 10 and bale case extension 24 to afford protection for the needle-carrying structure and needles 32.

It will be observed at this point that the stud 56 projects freely through the aperture 58 at the upper end 46 of the arm 42. The stud at the other side of the bale case will be similarly arranged. However, the upper ends of the arms will not escape from the studs, because the transverse connection established by the bight 40 is relatively rigid. Moreover, as will hereinafter appear, the braking means operates as a confining means and prevents accidental displacement of the upper ends of the arms 42.

Motion of the needle-carrying structure or U-shaped element 38 is imparted by driving means including a transverse driving shaft 62, conventionally forming part of the tying mechanism. A driving arm 64 is affixed to the left-hand end (visible here) of the shaft 62 and is connected by a pitman or link 66 to the arm 42 by means of a triangular plate 68, the plate 68 being rigidly affixed to the arm 42 and being pivotally connected at 70 to the link 66. Thus, as the shaft 62 rotates, it causes back and forth swinging of the U-shaped element 38. As is not unconventional, driving of the shaft 62 occurs at intervals in response to completion of the formation of a bale in the bale case, as in the U. S. Patent to Hill 2,512,896. These details are relatively unimportant here. Suffice it to appreciate that the movement of the needles 32 and U-shaped element 38 is cyclic and is therefore attended with instantaneous deceleration at opposite ends of the successive strokes. Stated otherwise, each time the needle and needle-carrying structure stops, it is subjected to shock, which is particularly significant when the needle points approach the tying mechanism 28, causing excessive vibration and jarring that very often interferes with the tying of a proper knot. Likewise, the shock at the other end of the stroke of the needle and needle-carrying structure does not add materially to the life of that structure. Moreover, as shown in the above-noted Hill patent, a dwell period in the driving phase of the needle is provided so that the needle is held momentarily stationary in tying position, whereby the time allotted for the knot-tying operation can be increased.

The solution to the aforementioned problem is provided, in one preferred form, by the present invention, on the basis of brake means, designated in its entirety by the numeral 72. This brake means comprises a first brake membere 74, a second brake member 76 and a third brake member 78. The second or intermediate brake member 76 is in the form of an arcuate plate-like member rigidly secured, as by welding at 80, to the upper terminal end portion 46 of the arm 42. The position of the plate 76 is such that it is substantially a radial or diametrical extension of the arm 42 and therefore extends beyond the axis of the pivot means 50. This arrangement enables the use of a relatively small plate in angular extent, because it will be seen that if the plate is positioned below the axis of the pivot means 50, the angular area thereof would have to be increased. Moreover, the brake means is more effective in proximity to the pivot means 50.

As illustrated, the plate 76 is of generally arcuate shape and has therein an elongated arcuate slot 82 through which project portions of a pair of nut-bolt-and-spring assemblies or yielding means 84. Each of the first and third brake members 74 and 78 is faced with frictional material which lies in face-to-face contact with opposite sides of the arcuate plate 76 and the yielding means operates not only to compress the structure, with the intermediate or second plate 76 sandwiched between the plates 74 and 78, but serves also to interconnect the plates 74 and 78 so as to fix these plates against movement relative to the intermediate or arcuate plate 76, which result is accomplished by an extension bolt portion 86 that is headed so as to secure the associated means 84 to the proximate bale case wall 20. A reenforcing member 88 is cooperatively secured in place to strengthen the bale case wall in the zone of the mounting of the brake means 72. Each means 84 includes a compression spring 90, the preload on which may be adjusted by nuts 92.

If it is desired to confine or at least to increase the effectiveness of the braking action at the one end or even at both ends of the stroke or cycle of the needle and needle-carrying structure, an intermediate portion of the plate 76 may be relieved or made of lesser thickness as at 94. The arcuate length of the slot 82 in the plate 76 is proportionate to the angular or arcuate length of the stroke of the needle-carrying structure or U-shaped element 38 and the portion of the plate 76 adjacent at least one end of the slot 82 is of increased thickness, as at 96, so as to increase the effectiveness of the brake means. The change in thickness is preferably accompanied by a ramp effect as at 98. Although the increased thickness is not visible at the opposite end of the slot 82 in the plate 76, it will be understood that such arrangement may be used at that end as well as the end that is visible. It should also be understood that a similar brake means may be provided at the opposite side of the structure, such brake means being mounted, of course, on the upper terminal end portion of the other arm 44 of the element 38. Likewise, the drive shaft 62 will include another arm and appropriate linkage connecting the arm 44, these requirements being fundamentally dictated by good design.

Throughout the specification as well as in the appended claims, reference is had to the bale case structure as including "top," "bottom," etc. walls. Resort has been had to the specific description only in the interests of clarity and not for the purpose of excluding such obvious possibilities as mounting the structure 38 on a vertical axis, etc.

Various other alterations and modifications in the preferred form of the invention illustrated may be achieved, and features other than those specifically enumerated herein will be appreciated, without departure from the spirit and scope of the invention.

What is claimed is:

1. In an agricultural baler, the combination of: an elongated bale case having apertured top and bottom walls and spaced apart upright side walls; tying mechanism carried by the bale case at its top wall; needle means positioned below the bale case and movable upwardly and downwardly through the bale case via said apertured top and bottom walls toward and away from the tying mechanism; needle-carrier means carrying the needle means on the bale case for movement as aforesaid, said needle-carrier means comprising a U-shaped element embracing the bale case from below and having a transverse bight below the bale case bottom wall and a pair of transversely spaced apart arms rigidly joined to said bight and extending upwardly respectively outwardly of and alongside the bale case side walls, said arms respectively having transversely alined terminal upper end portions at a level intermediate the bale case top and bottom walls; a pair of transversely spaced apart and coaxial pivot means mounted outside of the bale case with one of said pivot means mounted on each side wall of the bale case and pivotally supporting the terminal upper end portions of the respective arms, and mounting said element for swinging about the axis of said pivot means to carry the needle means toward and away from the tying mechanism; driving means on the bale case and connected to the U-shaped element for swinging said element; and brake means carried by the bale case and cooperative with the U-shaped element for braking the swinging of said element toward the tying mechanism, said brake means including a support secured to the bale case adjacent to the terminal upper end portion of one arm of the U-shaped element, a first brake member fixed to the support, and a second brake member fixed to the terminal upper end portion of said one arm and frictionally engaging the first brake member.

2. The invention defined in claim 1, in which: the brake means is positioned upwardly beyond the terminal upper end portion of the said one arm and the second brake member forms substantially a continuation of the terminal end portion of said arm beyond the pivot means for said one arm, the radial distance between each brake member and the axis of the pivot means being less than that between said axis and the bight of the element.

3. The invention defined in claim 1, in which: the first brake member comprises a plate-like member generally paralleling the bale case next adjacent to said one arm, the second brake member comprises a plate-like member in face-to-face relationship to the first member, a third plate-like brake member lies face-to-face with and at the other side of the second brake member so that said second member is sandwiched between said first and third members, and yielding means connects the first and third members to apply pressure to the second member.

4. The invention defined in claim 3, in which: the second brake member has an arcuate slot therethrough curved about the axis of the pivot means, and the yielding means that connects the first and third brake members includes a portion passing through said slot.

5. The invention defined in claim 4, in which: said portion of the yielding means is affixed to the proximate side wall of the bale case and mounts the first and second brake members on said side wall.

6. The invention defined in claim 4, in which: the second brake member is substantially a continuation of the terminal end portion of said one arm and extends upwardly beyond the aforesaid pivot means for said one arm so that the arcuate slot is disposed beyond said pivot means, and the first and third brake members and the yielding means are also disposed upwardly beyond said pivot means.

7. In an agricultural baler, the combination of: an elongated bale case having apertured top and bottom walls and spaced apart upright side walls; tying mechanism carried by the bale case at its top wall; needle means positioned below the bale case and movable upwardly and downwardly through the bale case via said apertured top and bottom walls toward and away from the tying mechanism; needle-carrier means carrying the needle means on the bale case for movement as aforesaid, said needle-carrier means comprising a generally upright arm positioned outwardly of and alongside one of the bale case side walls, said arm having a lower terminal end portion below the bale case bottom wall and a terminal upper end portion at a level intermediate the bale case top and bottom walls; pivot means outside of and mounted on said one side wall of the bale case and pivotally supporting the terminal upper end portion of the arm and mounting said arm for swinging about the axis of said pivot means to carry the needle means toward and away from the tying mechanism; driving means on the bale case and connected to the arm for swinging said arm; and brake means carried by the bale case and cooperative with the arm for braking the swinging of said arm toward the tying mechanism, said brake means including a support secured to the bale case adjacent to the terminal upper end portion of the arm, a first brake member fixed to the support, and a second brake member fixed to the terminal upper end portion of said arm and frictionally engaging the first brake member.

8. The invention defined in claim 7, in which: one of the brake members has an arcuate slot therein disposed beyond and formed about the axis of the pivot means, said brake members are positioned to lie in face-to-face contact, and yielding means is connected to one of said members and engages the other member to apply pressure thereto, said yielding means including a portion passing through the slot.

9. The invention defined in claim 8, in which: said slotted member has angularly spaced portions affording opposite ends for the slot and at least one of said portions being of increased thickness to afford increased braking effect at said one end of the slot.

10. In an agricultural baler, the combination of: an elongated bale case having apertured top and bottom walls and spaced apart upright side walls; tying mechanism carried by the bale case at its top wall; needle means carried by the bale case for movement upwardly from a retracted position below the bale case to a tying position adjacent to the tying mechanism and for return movement to said retracted position; drive means connected to the needle means causing the needle means to achieve said positions at intervals, said drive means including provision for effecting a dwell period in each of said positions; and brake means including a brake member carried by the needle means and a cooperative brake member carried by the bale case and engageable with the needle means brake member when said needle means is in its tying position and thereby to hold said needle means against premature gravitational departure from said tying position.

11. In an agricultural baler, the combination of: an elongated bale case having apertured top and bottom walls and spaced apart upright side walls; tying mechanism carried by the bale case at its top wall; needle means positioned below the bale case and movable upwardly and downwardly through the bale case via said apertured top and bottom walls toward and away from the tying mechanism; needle-carrier means carrying the needle means on the bale case for movement as aforesaid, said needle-carrier means comprising a generally upright arm positioned outwardly of and alongside one of the bale case side walls, said arm having a lower terminal end portion below the bale case bottom wall and a terminal upper end portion at a level intermediate the bale case top and bottom walls; pivot means outside of and mounted on said one side wall of the bale case and pivotally supporting the terminal upper end portion of the arm and mounting said arm for swinging about the axis of said pivot means to carry the needle means toward and away from the tying mechanism; driving means on the bale case and connected to the arm for swinging said arm; and brake means carried by the bale case and cooperative with the arm for braking the swinging of said arm toward the tying mechanism, said brake means including a support secured to the bale case adjacent to the terminal upper end portion of the arm, a first brake member fixed to the support, and a second brake member fixed to the terminal upper end portion of said arm and frictionally engaging the first brake member, one of the brake members having an arcuate slot therein adjacent to and formed about the axis of the pivot means, said brake members being positioned to lie in face-to-face contact, and yielding means connected to one of said members and engaging the other member to apply pressure thereto, said yielding means including a portion passing through the slot.

References Cited in the file of this patent

UNITED STATES PATENTS

| | | |
|---|---|---|
| 487,039 | Wickey | May 9, 1893 |
| 550,598 | Dederick | Dec. 3, 1895 |
| 994,661 | Schubert | June 6, 1911 |
| 1,307,879 | Reiniger | June 24, 1919 |
| 2,403,396 | Raney | July 2, 1946 |
| 2,610,573 | Altgelt | Sept. 16, 1952 |
| 2,651,252 | Pope | Sept. 8, 1953 |